(12) United States Patent
Coltro

(10) Patent No.: US 6,768,746 B1
(45) Date of Patent: Jul. 27, 2004

(54) TELECOMMUNICATIONS NETWORK WITH A TRANSPORT LAYER CONTROLLED BY AN INTERNET PROTOCOL LAYER

(75) Inventor: Claudio Coltro, Cassina de Pecchi (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/443,453

(22) Filed: Nov. 19, 1999

(30) Foreign Application Priority Data

Nov. 20, 1998 (IT) ......................... MI98A2517

(51) Int. Cl.[7] ............................... H04J 3/22
(52) U.S. Cl. ......................... 370/468; 370/466
(58) Field of Search .................. 370/474, 465–469

(56) References Cited

U.S. PATENT DOCUMENTS 5,619,650 A * 4/1997 Bach et al.
5,640,456 A * 6/1997 Adams, Jr. et al.
5,926,463 A * 7/1999 Ahearn et al.
6,456,632 B1 * 9/2002 Baum et al.

OTHER PUBLICATIONS

ITU–T Recommendation G.784 Jan. 1994.
ITU–T Recommendation G.707 Mar. 1996.

* cited by examiner

Primary Examiner—Chi Pham
Assistant Examiner—Thai Hoang
(74) Attorney, Agent, or Firm—Sughrue Mion, PLLC

(57) ABSTRACT

A telecommunications network comprising a transmission layer and an Internet Protocol (IP) layer is described wherein the IP layer controls the transport layer through a management interface (NM) between the IP layer and the transport one that controls the configuration of the transport network itself: the IP layer acts as a client and the transport layer acts as an server.

4 Claims, 5 Drawing Sheets

TELECOMMUNICATIONS NETWORK WITH A TRANSPORT LAYER CONTROLLED BY AN INTERNET PROTOCOL LAYER

BACKGROUND OF THE INVENTION

The present invention relates to the field of the telecommunications networks and more precisely to a telecommunications network having a data-centered structure.

The transmission network evolution leads to data-centered structures wherein services and related infrastructures will evolve and increase their potentialities towards the expectations and needs of the various service operators in a high competitiveness environment, wherein the data transmission and management portion will become more and more significant than the voice-related portion until the current conventional structures will be modified.

In the consolidated network structures the voice and data transport occurs by using synchronous hierarchy networks such as SDH and SONET, in which a series of important additional functionalities are also realized, like those known as OAM&P (Operation, Administration, Maintenance and Protection), as protection, supervision and reconfiguration, so as to provide a complete network management. The transport network layer then interconnects with other layers, such as ATM (Asynchronous Transfer Mode) and IP (Internet Protocol) in a known manner.

This evolution of the networks towards data-centered structures recently has led to the creation of two known types of networks, a first one wherein the quality of service is ensured through the network congestion control, and a second one wherein the quality of service is provided by overprovisioning the network with respect to the whole traffic to be managed.

The first known type of network termed "IP-over-ATM short-cutting" operates in such a way that, once an IP traffic flow has been identified, this is passed from the IP network to the ATM layer, where a possible congestion is best controlled and quality is assured, and then it is transferred over the SDH or SONET layer. The network management function is performed in the ATM and/or SDH or SONET transport layer.

The second known type of network, hereinafter termed network resource overprovisioning, uses high capacity connections forming part of an optical-level transmission layer, to interconnect the IP routers (known interconnection devices between the IP nodes) where all the OAM&P function resides. The transmission capacity is much greater than actually required: by ensuring that optical layer connections between the nodes are overprovisioned and capable of transporting sufficient band, one ensures that the IP network does not become congested.

Said two types of networks have a series of drawbacks which do not allow the problem of congestion to be solved in an effective manner without exceedingly increasing the cost of the network itself.

The first one has the drawback that the more the available bandwidth, the more the traffic increases, hence not allowing the congestion reduction; moreover, it is never easy to ensure that the connections between the routers are large enough to prevent the congestion, and therefore a continuous monitoring of the network congestion level is required to increase the capacity and reduce the queue times.

The second one requires some functionalities such as: traffic detailed management, parameter readjustment like bandwidth reservation, priority level determination, flow control and queue management in a very complicated and expensive manner. Moreover, this model is not applicable to Internet, since the latter is composed of a multiplicity of autonomously developing networks interconnected with each other.

SUMMARY OF THE INVENTION

Therefore, the object of the present invention is to overcome all the aforesaid drawbacks and to provide a new telecommunications network architecture, hereinafter referred to as "IP layer-controlled transmission network", based on an intelligent use of the transport transmission layer serving the IP layer.

In the following, a transmission layer with reference to the present invention is defined by any combination of PDH (Plesiochronous Digital Hierarchy), SDH (Synchronous Digital Hierarchy), SONET, WDM (Wavelength Division Multiplex) or optical network technologies which provides the necessary traffic relations and traffic transport capacities at the lowest cost.

In the IP layer-controlled transmission network in accordance with the present invention, the IP layer controls the transport layer by means of a management interface between the IP layer and the transport one that controls the transport network configuration itself: the IP layer acts as a manager and the transport layer acts as an agent. In the following "manager" will be called "client" and "agent" will be called "server", according to the Information Technology definitions.

Through the management interface, in case of congestion at some paths, the IP layer requests the transport layer more traffic connections in a manner corresponding to the service request by a customer in a public network or in a virtual private network (VPN). In contrast, in those areas where the problem of the congestion does not exist or is very rare, the IP layer may order the transport layer to release the existing traffic connections, thus determining a general increase in the efficiency and an optimization of the network resource allocation.

The wider the transport network serving the IP layer, the more efficient the resource allocation will be.

To achieve such objects, the present invention provides a telecommunication network as described in claim 1, which forms an integral part of the present description.

The present invention further provides the variants set forth in the dependent claims, which form an integral part of the present description.

The most evident advantages of the new network architecture are the following:

vis-à-vis the first known type of network, "IP-over-ATM short-cutting", it does not use the ATM layer, thus avoiding the problem of the inefficient ATM cell mapping function, known as "cell tax";

vis-à-vis the second known type of network, network resource overprovisioning, it uses the network and band resources only where necessary, ensuring a higher efficiency level in using the transport layer resources;

in an international Internet network, the national service provider networks (ISP) can use the transport networks of the national service providers to manage the band requests and to control the congestions of the national networks, whilst the international portions of Internet can control the international transport networks to handle their band requests;

the entire congestion control function is made by the IP layer, thus reducing the problem of the Quality of Service (QoS), namely packet loss or round trip delay.

BRIEF DESCRIPTION OF THE DRAWINGS

Further objects and advantages of the present invention will be evident from the following detailed description of an embodiment thereof and from the attached drawings provided only by way of explanation and not of limitation, wherein.

DETAILED DESCRIPTION OF THE INVENTION

Figure 1:
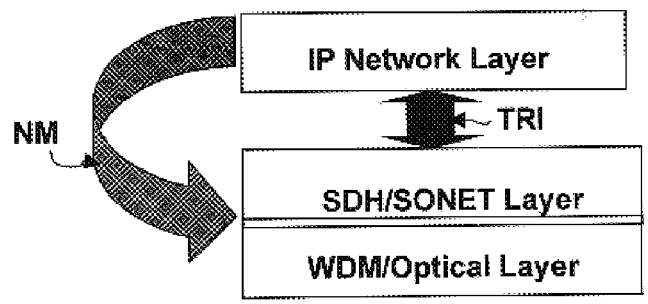
FIGS. 1 and 2 show functional diagrams of the IP-layer controlled transmission network in accordance with the present invention.
Figure 2:
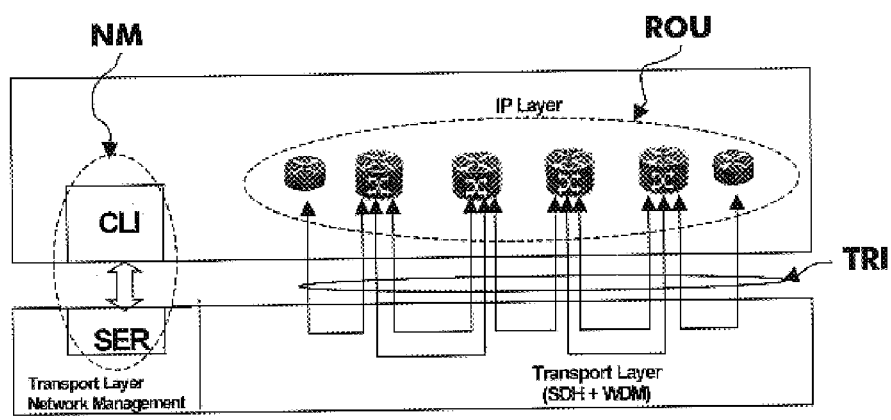

With reference to FIGS. 1 and 2, an IP layer controls an SDH/Sonet transport layer, which in turn may request connections with a high-capacity WDM/optical transmission layer.

This is implemented, in accordance with the present invention, by creating a management interface NM between the IP layer and the transport one which controls the configuration of the transport network itself: the IP layer acts as client and the transport layer acts as server.

In the known solutions, the IP and transport layers operate in an autonomous and independent manner, by exchanging only the pure traffic with each other through a known traffic interface TRI, that interconnects the transport network nodes with the IP network nodes provided with known devices termed routers ROU.

Therefore, in accordance with the present invention, an additional function is realized, said function being constituted by said management interface that, as shown in FIG. 2, splits into client function (CLI), residing in the IP layer, and server function (SER), residing in the Transport layer, respectively.

By means of the client portion CLI, the IP layer requests, possibly in a traffic increasing condition, more connections from the transport layer through the Server part SER, in a manner corresponding to the request for services by a customer in a public or virtual private network. On the contrary, the IP layer may order the transport layer to release the existing leased lines in those areas where the traffic decreases, thus determining an increase in the efficiency and an optimization of the network resource allocation.

Figure 3:
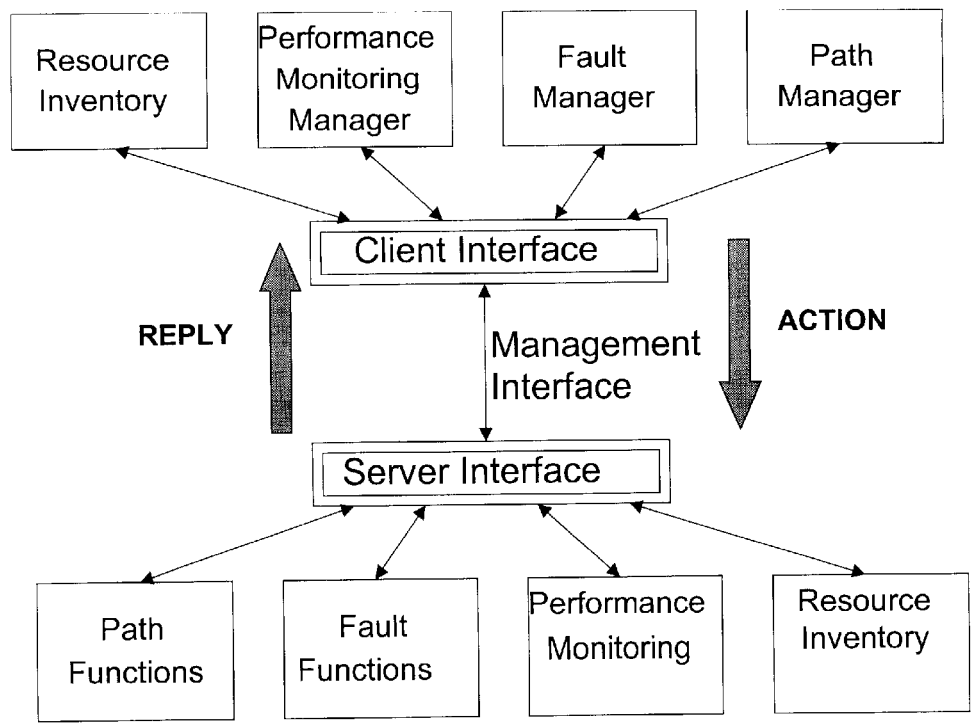
FIG. 3 shows a block diagram of a possible implementation of the management interface functionalities of FIGS. 1 and 2.

FIG. 3 shows an example of the types of functionalities requested in the client CLI and server SER parts of the management interface NM.

The functionalities requested in the two parts of the interface are of the following types.

Functions of the client side CLI:

resource inventory function: it collects information, taken from the transport layer, about the availability of communication resources which could be used by the IP layer;

performance monitoring: it collects, from the transport layer, information to check whether the desired service quality is achieved by the transport layer itself;

fault management: it requests alarm information from the transport layer;

connection management: it requests the transport layer to establish a traffic connection configuration between some given ports used by IP routers to control the IP traffic congestion. In a similar way it may request the release of traffic connections if the latter are no longer necessary or they are underutilized.

Function of the server side SER:

performance monitoring: it reports information from the transport layer on the network resources available to the IP layer;

fault management: it processes alarm information from the transport layer to be reported to the IP layer;

connection management: it carries out the requests from the IP layer to establish the traffic connection configurations between some given ports used by routers; in a similar way it may release traffic connections if these are no longer requested by the IP layer.

In order to provide such a functionality, information shall be exchanged between the IP and transport layers.

The information flowing from the client to the server is of the following type:

request of traffic connection configuration between a pair of ports or nodes at a certain rate;

request of a certain quality of service for said traffic connection configuration;

request of resource inventory status of the transport network layer;

release of a traffic connection between a given pair of ports or nodes at a given rate;

request for alarm information and for monitoring of traffic connection performances.

On the contrary, the information flowing in the opposite direction from server to client is of the following type:

confirmation or rejection of the request for traffic connection configuration;

confirmation or rejection of the quality of service request from the client;

information about the requested resource inventory status of the transport network layer;

confirmation of traffic connection release;

reporting of alarm and performance monitoring information (on request);

autonomous (spontaneous) alarm reporting.

In general, said functionalities requested in the client CLI and server SER parts of the management interface NM are of a known type, as e.g. described in the ITU-T Recommendation G.784, issued by the International Telecommunication Unit, concerning the SDH network management system organization, reference to which is made for a detailed description.

As to the information to be exchanged between the two layers for realizing said functionality, said information is present or can be directly obtained at the nodes of the respective IP and transmission layers.

The information necessary for the client part CLI can be obtained from the Internet Control Message Protocol (ICMP) of intercommunication between the IP Routers, for example relating to the Weighted Random Early Detection (WRED) signal for managing the buffers and the queues on the wide area network (WAN) traffic, or to the Exterior Border Gateway Protocol (EBGP) signal for balancing the traffic load on the WAN interfaces.

The information necessary for the server part SER can be obtained at the nodes of the transport network with known processing techniques of the SDH frame content, especially the header, as known e.g. from the ITU-T Recommendations G.784 cited above and G.707 (chapters 3 and 9) which describes the structure of the frame and of the nodes of the SDH network.

Figure 4:
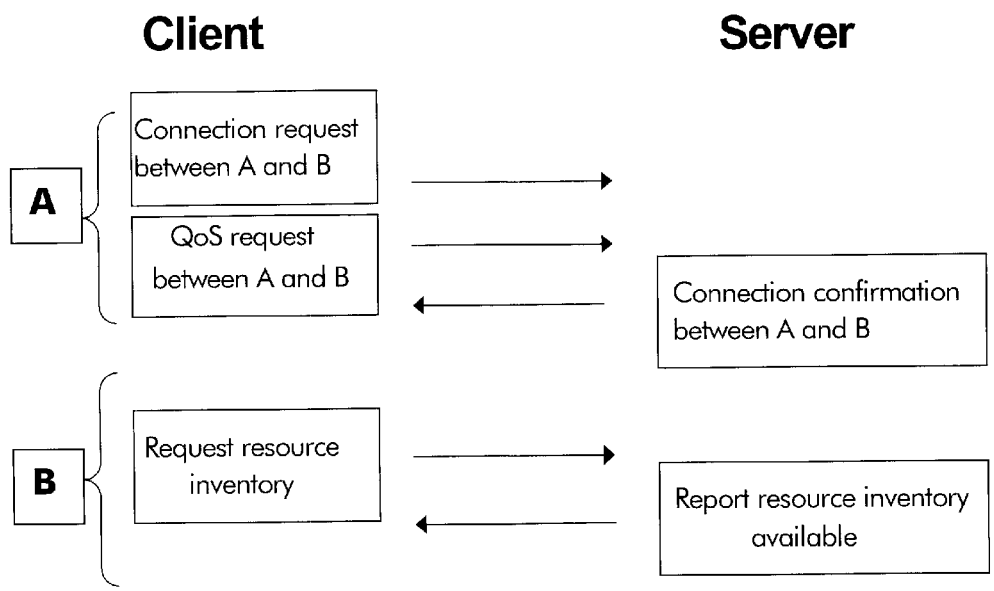
FIG. 4 shows an example of message flow through the management interface of FIG. 3.

In FIG. 4 there is illustrated and example of message flow through the management interface NM.

In the event of messages that serve to establish a connection (type A in the figure), a request for connection between two ports or nodes and/or a request for quality of service QoS between two ports or nodes is sent by the client CLI to the Server SER. Afterwards, once the related function has been carried out, the Server answers back to the Client with a confirmation message of established connection between the two ports or nodes.

In the event of messages that serve to check the network resource availability (type B in the figure), for instance a message of resource inventory status request is sent by the Client CLI to the Server SER. Afterwards, once the related function has been carried out, the Server answers back to the Client by an information message on the requested resource inventory status.

The message flows between the client and server functions can be supported by means of several types of physical connections and exchanged through the related known transmission protocols. For example:

a LAN connection if client and server functions are carried out by computers or routers located in the same building;

WAN connections if client and server functions are realized by computers or routers not located in the same building, with a number of options such as: X.25 standard public network, frame-relay network, IP www-type network, dedicated leased lines, ISDN public networks, modems connected to the PSTN network.

With reference to FIGS. 5 to 9, some further detailed examples of information flow exchange are shown between the client and server layers, relating to some functions to be implemented, with indication of examples of known exchange protocols used, like RMI (Remote Method Invocation), CORBA, FTP (File Transfer Protocol), in both events of messages that serve to establish a connection (type A of FIG. 4), and messages that serve to check the network resource availability (type B of FIG. 4).

Figure 5:
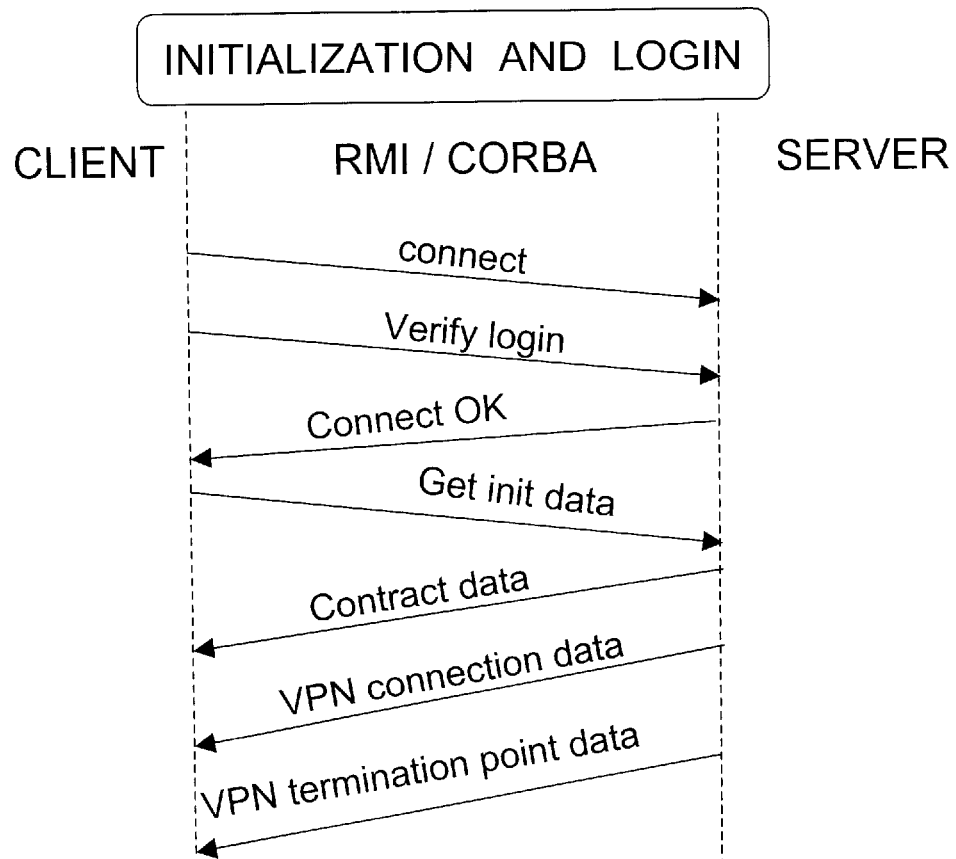
FIGS. 5 to 9 show some further detailed examples of information flow exchange between the client and server layers, relating to some functions to be implemented.

In FIG. 5 the "Initialization and login" function is shown, (type A) to be run at the initialization of the procedures. The two layers, client and server, exchange information and data by means of RMI or CORBA protocols, by the following procedure: the "connect" and "verify login" messages are sent from client to server, which in turn sends back a "connect OK" acknowledge message once the related function has been carried out. Then a message of "get initialization data" is sent from client to server relating to all the data for initialization: the server replies to the client with a "contract data" message, containing the data relating to the specific contract initialized, and then with messages relating to "VPN connection data" and "VPN termination point data" (VPN=Virtual Private Network).

Figure 6:
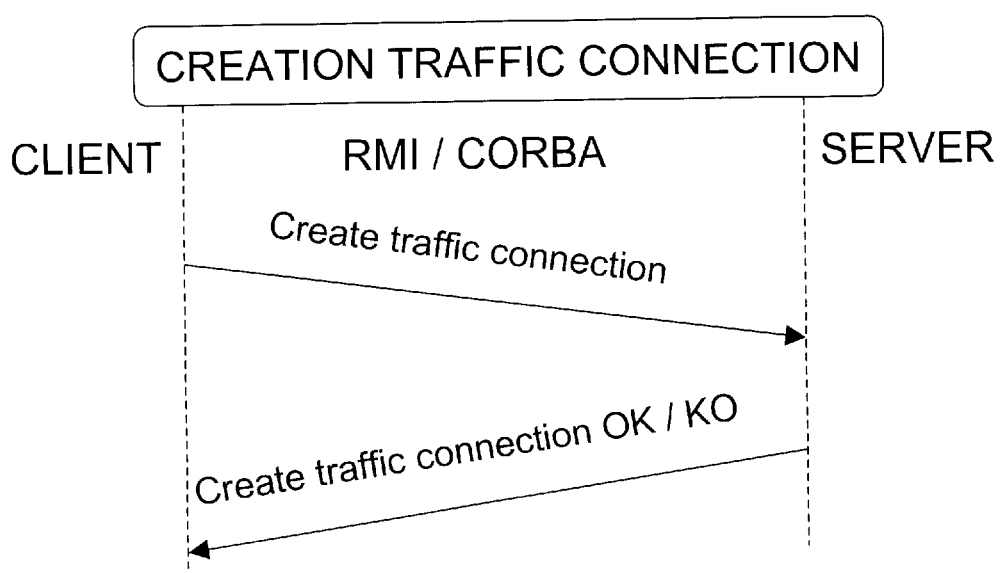
Figure 7:
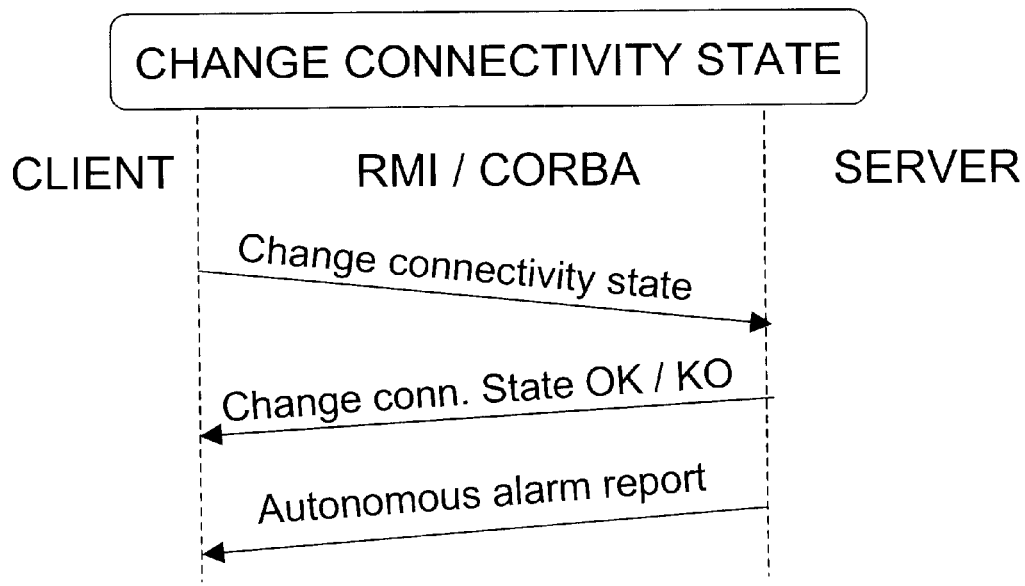

In FIG. 6 the "Creation of Traffic Connection" function is shown, (type A) to be run at the creation of a new traffic connection. By means of RMI or CORBA protocols, the client sends a message of "create traffic connection" to the server, which in turn sends back a "create traffic connection" OK or KO acknowledge message, depending on whether the connection is created or not, once the related function has been carried out In FIG. 7 the "Change Connectivity State" function is shown, (type A) to be run when a change in the connectivity status occurs. The Connectivity state is defined i.e. through the following states:

Defined: The connectivity is created in Operating Systems (OS) with some characteristics like end-points, rate, required type of protection.

Allocated: when the connectivity reaches this state it means that, through automatic path search algorithm, an OS application had identified all the relevant network resources (Network Elements, Links.) in order to set-up the connectivity. These resources are reserved in the OSs Data Bases, but no command is sent to Network Elements.

Implemented: The connectivity reaches this state when commands are sent from Network Management OSs to relevant Network Elements in order to really set-up the Connectivity inside the Transport Network (SDH/IWDM).

Commissioned: in this state, possible alarms are stored in loggers and Performance Monitoring data collection is started.

By means of RMI or CORBA protocols, the client sends a message of "change connectivity state" to the server, which in turn replies with a "change connectivity state" OK or KO acknowledge message, depending on whether the change in connectivity is made or not, once the related function has been carried out. A message of "autonomous alarm report" can also be generated by the server to the client, to report unsolicited alarm condition.

Figure 8:
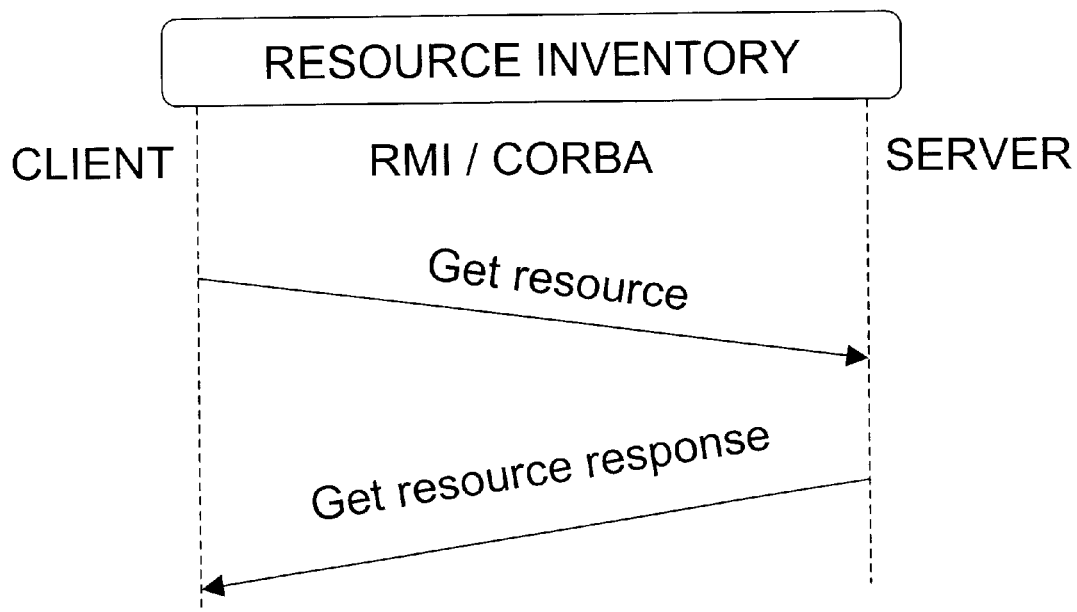

In FIG. 8 the "Resource Inventory" function is shown, (type B). By means of RMI or CORBA protocols, the client sends a message of "get resource" to the server, which in turn replies with a message of "get resource response", once the related function has been carried out.

Figure 9:
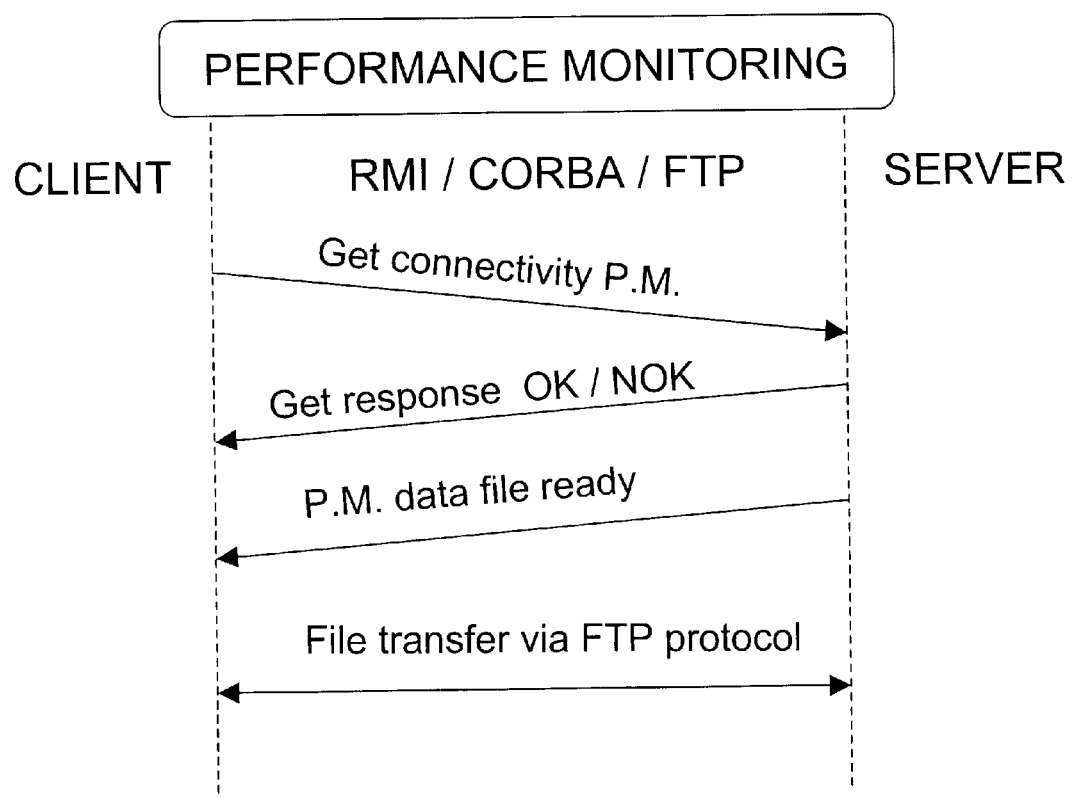

In FIG. 9 the "Performance Monitoring" function is shown, (type B). By means of RMI, CORBA or FTP protocols, the client sends a message of "get connectivity performance monitoring" to the server, which in turn replies with a message of "get response" OK or NOK, once the related function of Performance Monitoring data collection has been carried out or not, and then with a message of "Performance Monitoring data file ready". In addition a file transfer may occur bidirectionally via the FTP protocol.

The Management Interface according to the invention can be implemented by using known structures and languages: for example in the same way as the Network Management function of an SDH network is made, by using a known programming structure, i.e. an object oriented one, and a known language as C++, or any other suitable known language.

It is not deemed necessary to provide further description of the embodiment, as a person skilled in the art will be able to carry out the invention starting from the functional description given above.

What is claimed is:

1. A data-centered structure telecommunications network, comprising:

an Internet protocol (IP) layer;

a transport layer; and a management interface;

wherein the IP layer controls the transport layer through the management interface by, determining the activation or the release of lines according to the transport requirements of the IP layer;

wherein said management interface comprises client functions (CLI), residing in the IP layer, and server functions (SER), residing in the transport layer, exchanging messages with each other;

wherein said client functions (CLI) comprise:
  a resource inventory function: it collects information from the transport layer relating to the availability of communication resources which could be used by the IP layer;
  a performance monitoring function: it collects information from the transport layer in order to check whether the desired service quality is achieved by the transport layer itself;
  a fault management function: it requests alarm information from the transport layer;
  a connection management function: it requests the transport layer to establish a traffic connection configuration or the release of traffic connections when these are no longer necessary;

wherein said server functions (SER) comprise:
  a performance monitoring function: it reports information from the transport layer about the network resources which are available for the IP layer;
  a fault management function: it processes alarm information from the transport layer which should be reported to the IP layer;
  connection management function: it carries out the requests from the IP layer to establish the traffic connection configurations or to release traffic connections when these are no longer requested by the IP layer.

2. A data-centered structure telecommunications network according to claim 1, wherein said lines comprise leased lines.

3. A network manager operable in a data-centered structure telecommunications network, wherein said data-centered structure telecommunications network comprises:
  an Internet protocol (IP) layer;
  a transport layer; and
  a management interface;
wherein the IP layer controls the transport layer through the management interface by, determining the activation or the release of lines according to the transport requirements of the IP layer;

wherein said management interface comprises client functions (CLI), residing in the IP layer, and server functions (SER), residing in the transport layer, exchanging messages with each other;

wherein said client functions (CLI) comprise:
  a resource inventory function: it collects information from the transport layer relating to the availability of communication resources which could be used by the IP layer;
  a performance monitoring function: it collects information from the transport layer in order to check whether the desired service quality is achieved by the transport layer itself;
  a fault management function: it requests alarm information from the transport layer;
  a connection management function: it requests the transport layer to establish a traffic connection configuration or the release of traffic connections when these are no longer necessary;

wherein said server functions (SER) comprise:
  a performance monitoring function: it reports information from the transport layer about the network resources which are available for the IP layer;
  a fault management function: it processes alarm information from the transport layer which should be reported to the IP layer;
  connection management function: it carries out the requests from the IP layer to establish the traffic connection configurations or to release traffic connections when these are no longer requested by the IP layer;
  wherein the network manager sends commands to set-up connectivity.

4. A network element operable in a data-centered structure telecommunications network, wherein said data-centered structure telecommunications network comprises:
  an Internet protocol (IP) layer;
  a transport layer; and
  a management interface;
wherein the IP layer controls the transport layer through the management interface by, determining the activation or the release of lines according to the transport requirements of the IP layer;

wherein said management interface comprises client functions (CLI), residing in the IP layer, and server functions (SER), residing in the transport layer, exchanging messages with each other;

wherein said client functions (CLI) comprise:
  a resource inventory function: it collects information from the transport layer relating to the availability of communication resources which could be used by the IP layer;
  a performance monitoring function: it collects information from the transport layer in order to check whether the desired service quality is achieved by the transport layer itself;
  a fault management function: it requests alarm information from the transport layer;
  a connection management function: it requests the transport layer to establish a traffic connection configuration or the release of traffic connections when these are no longer necessary;

wherein said server functions (SER) comprise:
  a performance monitoring function: it reports information from the transport layer about the network resources which are available for the IP layer;
  a fault management function: it processes alarm information from the transport layer which should be reported to the IP layer;
  connection management function: it carries out the requests from the IP layer to establish the traffic connection configurations or to release traffic connections when these are no longer requested by the IP layer,
  wherein the network element is identified to set-up connectivity.

* * * * *